US012614243B2

(12) United States Patent
Yang

(10) Patent No.: US 12,614,243 B2
(45) Date of Patent: Apr. 28, 2026

(54) GPU PROCESSOR SYSTEM

(71) Applicant: METAX INTEGRATED CIRCUITS (SHANGHAI) CO., LTD., Shanghai (CN)

(72) Inventor: Jian Yang, Shanghai (CN)

(73) Assignee: METAX INTEGRATED CIRCUITS (SHANGHAI) CO., LTD., Shanghai (CN)

( * ) Notice: Subject to any disclaimer, the term of this patent is extended or adjusted under 35 U.S.C. 154(b) by 169 days.

(21) Appl. No.: 18/602,009

(22) Filed: Mar. 11, 2024

(65) Prior Publication Data

US 2024/0311953 A1     Sep. 19, 2024

(30) Foreign Application Priority Data

Mar. 14, 2023    (CN) .......................... 202310239277.9

(51) Int. Cl.
    *G06T 1/60*        (2006.01)
    *G06F 13/42*      (2006.01)

(52) U.S. Cl.
    CPC ............ *G06T 1/60* (2013.01); *G06F 13/4221* (2013.01); *G06F 2213/0042* (2013.01)

(58) Field of Classification Search
    CPC . G06T 1/60; G06T 1/20; G06T 15/005; G06F 13/4221; G06F 2213/0042
    See application file for complete search history.

(56) References Cited

U.S. PATENT DOCUMENTS

2008/0320267 A1* 12/2008 Bilger ..................... G11C 8/18
                                          711/170
2015/0113198 A1     4/2015 Li et al.
                  (Continued)

FOREIGN PATENT DOCUMENTS

CN       102541804 A     7/2012
CN       203720713 U     7/2014
                  (Continued)

OTHER PUBLICATIONS

Zhang et al., Graphics and Video Performance Optimization with Godson UA Mechanism, Chinese High Technology Letters, Apr. 2015, 357-364, vol. 25-4, Ministry of Science and Technology of PRC, Beijing, China.

*Primary Examiner* — Kent W Chang
*Assistant Examiner* — Johnny T Le

(57) ABSTRACT

The system comprises a set of N GPU chips and a graphics memory $H1_j$ on a graphics card on which the GPU chip $C_j$ is mounted. $C_j$ includes a graphics memory controller $MC1_j$ and cross-chip interconnectors. The system further comprises graphics memory expansions. The graphics memory expansion $E_i$ comprises a graphics memory controller $MC2_i$, a graphics memory $H2_i$ and a cross-chip interconnector $SAC_i$. The q(j)-th cross-chip interconnector $FAC_{q(j)}{}^j$ and $SAC_i$ are interconnected using a non-QPI interconnection bus. $MC1_j$ is unable to control access to $H2_i$, and $MC2_i$ is unable to control access to $H1_j$. Any processor other than $C_j$ has no access to $MC2_i$, or the processor is given access to $MC2_i$ exclusively through $FAC^j{}_{q(j)}$ and $SAC_i$ if the processor has access to $MC2_i$. Separate graphics memories special for GPU are increased in the system, without altering the hardware architectures of $MC1_j$ and GPU.

10 Claims, 1 Drawing Sheet

(56)        References Cited

U.S. PATENT DOCUMENTS

| | | | |
|---|---|---|---|
| 2016/0274923 A1* | 9/2016 | Harriman | ............ G06F 13/4208 |
| 2018/0181340 A1 | 6/2018 | Osqueizadeh | |
| 2022/0043759 A1* | 2/2022 | Feehrer | .............. G06F 13/1652 |
| 2023/0066833 A1 | 3/2023 | Otsuka | |

FOREIGN PATENT DOCUMENTS

| | | |
|---|---|---|
| CN | 205091735 U | 3/2016 |
| CN | 103488436 B | 4/2017 |
| CN | 203966018 U | 11/2019 |
| CN | 210270884 U | 4/2020 |
| CN | 113835487 A | 12/2021 |
| CN | 115098422 A | 9/2022 |
| CN | 115952126 A | 4/2023 |
| CN | 219392653 U | 7/2023 |

* cited by examiner

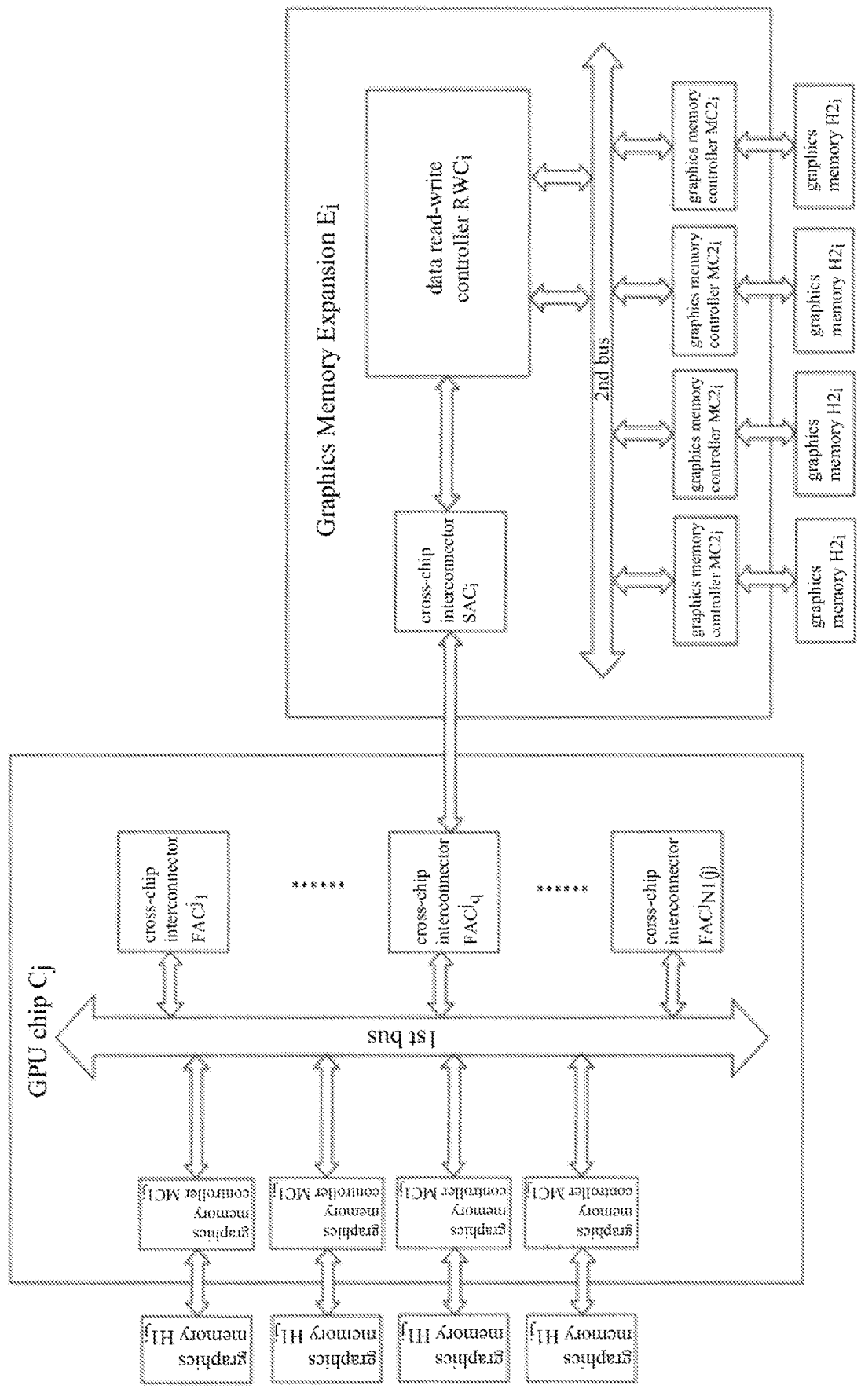

GPU PROCESSOR SYSTEM

RELATED APPLICATION

The application claims the benefit of CN202310239277.9 filed Mar. 14, 2023, which is incorporated herein by reference in its entirety.

FIELD OF THE INVENTION

The present invention relates to the field of computer science, in particular to a GPU processor system.

BACKGROUND OF THE INVENTION

In the field of computer science, typical processors include central processing units (CPU) and graphics processing units (GPU). Generally, a memory accessed by a CPU is called "an internal memory", while that accessed by a GPU is called "a graphics memory". The internal memory and the graphics memory may be memories with the same structures and/or parameters, or memories with different structures and/or parameters. A device for controlling the internal memory is usually called an internal memory controller, and a device for controlling the graphics memory is usually called a graphics memory controller.

There are two specific cases for a CPU to access an internal memory through an internal memory controller. In one case, the internal memory controller is set separately from the CPU, for example, the internal memory controller is incorporated in a north bridge chip, so that the CPU accesses the internal memory controller in the north bridge chip through a front side bus (FSB), thereby achieving an access to the internal memory. In the other case, the internal memory controller is integrated in the CPU, so that the CPU can access the internal memory controller and further the internal memory, without requiring a front side bus. Furthermore, the internal memory is usually installed in the internal memory slot of a motherboard in a pluggable way. For example, the internal memory slot may be a slot that supports dual inline memory modules (DIMM).

In case of inadequate memory capacity for a CPU, since the internal memory is pluggable, it is convenient to expand the internal memory by increasing the number of internal memories or replacing with an internal memory having a greater capacity. Furthermore, if there is a shortage in the number of internal memory slots, it is feasible to expand the internal memory by externally connecting with internal memory slots. For instance, the internal memory is expanded by externally connecting with an internal memory expansion chip using a QPI bus and/or SMI (Scalable Memory Interconnect) link. The patent CN103488436B gives an illustration on internal memory expansion based on external connection with an internal memory expansion chip using a QPI bus, and the patent CN205091735U involves internal memory expansion using the QPI bus and the SMI link. Obviously, these internal memory capacity expansion methods simply change the physical location of the expanding internal memory and the connection between the internal memory and the CPU, without changing the architecture among the CPU, the internal memory controller and the internal memory, that is to say, the CPU accesses the expanding internal memory via the internal memory controller.

Furthermore, symmetrical multi-processing can be used for sharing system memories, or non-uniform memory access is employed to share internal memories of different CPUs.

A GPU involves an integrated graphics card and a discrete graphics card.

The GPU on an integrated graphics card is integrated on a motherboard or inside other chips of the motherboard, usually has no separate graphics memory, and needs to share an internal memory with a CPU, that is, a configurable part of the internal memory is used for CPU and another configurable part of the internal memory is used for GPU. In this case, the access of GPU to the internal memory needs to go through the internal memory controller of the CPU, which means the access path includes the GPU, the internal memory controller of the CPU and the internal memory. When the capacity of the internal memory required by the GPU is inadequate, an internal memory can be added for the GPU by configuration.

The GPU integrated on a discrete graphics card is a separate chip irremovably coupled to the graphics card. The graphics card is connected to a motherboard via an interface bus. For example, the interface bus includes an accelerate graphical port (AGP) bus or a peripheral component interconnect express (PCIe) bus. For example, the fixation is welding. The GPU on a discrete graphics card usually has a graphics memory controller integrated therein and accesses a separate graphics memory through the graphics memory controller.

In the early days, in case of inadequate capacity of a graphics memory, the GPU on a discrete graphics card adopts processing similar to that of a CPU, i.e., increasing graphics memories via graphics memory slots or replacing with greater-capacity graphics memories. The graphics memory slots may be located on a motherboard or a graphics card on which the GPU is mounted. In addition, the graphics memories can be increased by externally connecting with a separate graphics memory expansion card via an interface. For example, Chinese patents CN203966018U and CN203720713U give introduction on the technology where the graphics memory slots are located on a motherboard; GeForce 6200A graphics cards from GALAXY involve the technology where the graphics memory slots are located on the graphics cards (tech.sina.com.cn/h/2005-04-8/1027596611.shtml?fromwap); and AV264+ graphics cards from ASUS involve the technology of standalone graphics memory expansion cards (www.163.com/mobile/article/BIGDIHOD0011309K.html). Obviously, these graphics memory capacity expansion methods simply change the physical location of a graphics memory and/or an expanding graphics memory and the connection between a graphics memory and a GPU, without changing the architecture among the GPU, a graphics memory controller and the graphics memory, that is, the GPU accesses the expanding graphics memory via the graphics memory controller.

The graphics memory expansion methods of GPU on a discrete graphics card in the early days have the following technical problems:

1. the slot or the interface for removable installation of a graphics memory occupies much physical space of a graphics card and/or a motherboard, which affects arrangement of other components on the graphics card and/or the motherboard, where the GPU is mounted, under the circumstance of significant improvement in the GPU function and/or performance; and
2. the number of pin interfaces of slots sees a great increase along with the significant improvement in memory function and/or performance, thereby posing a challenge to wiring between the GPU and the graphics memory.

In order to solve these problems, unlike CPUs and GPUs on discrete graphics cards in the early days, the graphics memories of high-performance GPUs of discrete graphics cards are packaged in the GPUs or irremovably coupled to the graphics cards on which the GPUs are mounted, so as to reduce physical space occupation and ease the challenge posed by wiring. Since graphics memories are unalterable, graphics memory controllers of high-performance GPUs on discrete graphics cards are usually not specifically designed to be equipped with the function of supporting an additional expanding graphics memory. For example, the graphics memory of a high-performance GPU on a discrete graphics card is a high-bandwidth memory (HBM) or graphics double data rate (GDDR).

In the high-performance GPU on a discrete graphics card, the graphics memory accessible by a graphics memory controller is usually packaged in the GPU or irremovably coupled to a graphics card on which the GPU is mounted. To inadequate graphics memory capacity, there are two solutions. One solution is to learn from the access of an integrated graphics card to an internal memory and share the internal memory of a CPU, that is, the GPU accesses the internal memory of the CPU via the internal memory controller of the CPU through the interface between a graphics card and a motherboard. For example, the interface between a graphics card and a motherboard is, for instance, an AGP bus or PCIe bus. The other solution is to share graphics memories of other GPUs, that is, the GPU accesses the graphics memories of other GPUs interconnecting with the GPU through cross-chip interconnection interfaces. For example, the cross-chip interconnection interface involves NVLink and/or NVSwitch.

The graphics memory expansion methods of the high-performance GPU on a discrete graphics card have such a technical problem that it is unable to increase the upper limit of the internal memory and/or graphics memory of GPU and CPU or the upper limits of the graphics memories of the GPU and other GPUs, if no alteration is made to the graphics memory controller of GPU, since the GPU and the CPU share the internal memory, or the GPU and other GPUs share the graphics memory. When the CPU or other GPUs also need much internal memory or graphics memory, there poses a serious internal memory or graphics memory competition.

OBJECTS AND SUMMARY OF THE INVENTION

In order to solve these technical problems, the invention aims to provide a processor system.

In one embodiment, the invention provides a GPU processor system. The system comprises a set of N GPU chips $\{C_1, C_2, \ldots, C_j, \ldots, C_N\}$ and a graphics memory $H1_j$, which is irremovably coupled to a graphics card on which $C_j$ is mounted, wherein $C_j$ is the j-th GPU chip in the set of GPU chips, j is an integer ranging from 1 to N, and N is the number of GPU chips and a positive integer; $C_j$ includes an unalterable graphics memory controller $MC1_j$ and a set of N1(j) cross-chip interconnectors $\{FAC^j_1, FAC^j_2, \ldots, FAC^j_{q(i)}, \ldots, FAC^j_{N1(j)}\}$, $FAC^j_{q(j)}$ is the q(j)-th cross-chip interconnector on $C_j$, q(j) is an integer ranging from 1 to N1(j), and the function value of N1(j) is a positive integer; $MC1_j$ is configured to control access to $H1_j$; the system further comprises M separate graphics memory expansions $\{E_1, E_2, \ldots, E_i, \ldots, E_M\}$, $E_i$ is the i-th graphics memory expansion, i is an integer ranging from 1 to M, and M is the number of graphics memory expansions and a positive integer; $E_i$ includes a graphics memory controller $MC2_i$, a graphics memory $H2_i$ and a cross-chip interconnector $SAC_i$; and $MC2_i$ is configured to control access to $H2_i$.

$FAC^j_{q(j)}$ and $SAC_i$ are interconnected using a non-QPI interconnection bus.

$MC1_j$ is unable to control access to $H2_i$, and $MC2_i$ is unable to control access to $H1_j$.

For any processor other than $C_j$: the processor has no access to $MC2_i$; or the processor is given access to $MC2_i$ exclusively through $FAC^j_{q(j)}$ and $SAC_i$ if the processor has access to $MC2_i$.

The invention has the following advantages:

a processor system provided in the invention is connected with the cross-chip interconnector of a graphics memory expansion via the cross-chip interconnector of a GPU chip. The GPU chip accesses $MC2_i$ via the cross-chip interconnector of the GPU chip and the cross-chip interconnector of the graphics memory expansion, thereby accessing $H2_i$, without requiring the alteration of $MC1_j$ inside a high-performance GPU or the replacement of $H1_j$ irremovably coupled to MC1j. It means separate graphics memories special for GPU can be increased, without altering the hardware structure of $MC1_j$ of the GPU or the overall hardware architecture of the GPU, while achieving higher compatibility and lower cost.

BRIEF DESCRIPTION OF FIGURES

In order to clearly illustrate the technical solutions and advantages of embodiments of the invention or the prior art, a brief introduction is given hereinafter to the accompanying figures required in the description of the embodiments or the prior art. Obviously, the accompanying figures in the description hereinafter are only illustration of some embodiments of the invention. For those skilled in the art, other accompanying figures can be obtained on the basis of these figures without creative effort.

FIG. 1 is a system diagram of a GPU processor system provided in an embodiment of the invention.

DETAILED DESCRIPTION OF THE EMBODIMENTS

In order to further elaborate the technical means and effects adopted in the invention to achieve predetermined purposes, a detailed description about the specific implementation, structures, features and effects of the GPU processor system based on the invention is given hereinafter in conjunction with accompanying figures and preferred embodiments. In the description hereinafter, different "one embodiment" or "another embodiment" may not necessarily refer to the same embodiment. In addition, specific features, structures, or characteristics in one or more embodiments may be combined in any proper form.

Unless otherwise defined, all the technical and scientific terms used herein have the same meanings as those commonly understood by those skilled in the art.

A GPU processor system provided in the invention is specifically illustrated in conjunction with the accompanying figure.

As shown in FIG. 1, a GPU processor system comprises a set of N GPU chips $\{C_1, C_2, \ldots, C_j, \ldots, C_N\}$ and a graphics memory $H1_j$, which is irremovably coupled to a graphics card on which $C_j$ is mounted, wherein $C_j$ is the j-th GPU chip in the set of GPU chips, j is an integer ranging from 1 to N, and N is the number of GPU chips and a positive integer; $C_j$ includes an unalterable graphics memory controller $MC1_j$ and a set of $N1(j)$ cross-chip interconnectors $\{FAC^j_1, FAC^j_2, \ldots, FAC^j_{q(j)}, \ldots, FAC^j_{N1(j)}\}$, $FAC^j_{q(j)}$ is the $q(j)$-th cross-chip interconnector on $C_j$, $q(j)$ is an integer ranging from 1 to $N1(j)$, and the function value of $N1(j)$ is a positive integer; and $MC1_j$ is configured to control access to $H1_j$.

Optionally, $C_j$ is a high-performance GPU chip internally provided with an interface for the cross-chip interconnector on $C_j$ to connect with a first bus.

Preferably, the GPU chip is one of graphics processors, general-purpose graphics processors and AI processors.

Preferably, $H1_j$ is a graphics memory complying with HBM or GDDR.

It should be noted that $MC1_j$ is integrated inside the GPU as an important component unit inside the GPU. $MC1_j$ is connected with $H1_j$. if $H1_j$ is HBM, $H1_j$ is packaged together with a GPU chip; and if $H1_j$ is GDDR, $H1_j$ is welded on a graphics card on which the GPU chip is mounted.

Furthermore, the system further comprises a set of M separate graphics memory expansions $\{E_1, E_2, \ldots, E_i, \ldots, E_M\}$. $E_i$ is the i-th graphics memory expansion, i is an integer ranging from 1 to M, and M is the number of graphics memory expansions and a positive integer; $E_i$ includes a graphics memory controller $MC2_i$, a graphics memory $H2_i$ and a cross-chip interconnector $SAC_i$; and $MC2_i$ is configured to control access to $H2_i$, wherein $E_i$ does not include a GPU and/or CPU chip.

Preferably, $H2_i$ has a greater memory capacity than $H1_j$ and a lower bandwidth than $H1_j$.

Preferably, the graphics memory $H2_i$ is a graphics memory complying with DDR or LPDDR.

Optionally, the graphics memory $H2_i$ is removably coupled to $E_i$ in such a manner that the graphics memory controller $MC2_i$ is interconnected with the graphics memory $H2_i$ via a DIMM interface, which is convenient for plugging, to facilitate replacement of the graphics memory $H2_i$.

Optionally, $E_i$ includes a set of $M(i)$ graphics memory controllers $MC2_i$ and a set of $M(i)$ graphics memories $H2_i$, wherein the $M(i)$ graphics memories $H2_i$ may all comply with DDR; or they may all comply with LPDDR; or part of the graphics memories $H2_i$ comply with DDR while the remaining graphics memories $H2_i$ comply with LPDDR.

Furthermore, $FAC^j_{q(j)}$ and $SAC_i$ are interconnected using a non-QPI interconnection bus, wherein $FAC^j_{q(j)}$ and $SAC_i$ comply with the same interconnection bus protocol and have the same structure, $FAC^j_{q(j)}$ includes a physical layer, an adaptation layer and a protocol layer, and $SAC_i$ includes a physical layer, an adaptation layer and a protocol layer.

Optionally, the interconnection protocol bandwidth of $FAC^j_{q(j)}$ and $SAC_i$ is higher than that of a PCIe bus.

Preferably, $FAC^j_{q(j)}$ and $SAC_i$ are interconnected using a bus complying with one of MetaX Link, NVLink, Infinity Fabric and UCIe. It is understood that the maximum bandwidths of NVLink 1.0, NVLink 2.0 and MetaX Link can reach 160 GB/s, 300 GB/s and 128 GB/s, respectively; and the maximum bidirectional communication bandwidth of GPU connected by use of PCIe can reach 32 GB/s. Therefore, the bandwidth of a graphics memory expansion equipped with NVLink 1.0 is about five times that equipped with PCIe, the bandwidth of a graphics memory expansion equipped with NVLink 2.0 is about nine times that equipped with PCIe, and the bandwidth of a graphics memory expansion equipped with MetaX Link is about four times that equipped with PCIe.

Preferably, $FAC^j_{q(j)}$ and $SAC_i$ comply with UCIe, and an interconnector complying with UCIe has a power consumption lower than those complying with NVLink and Infinity Fabric.

$FAC^j_{q(j)}$ and $SAC_i$ adopt peer-to-peer connection which enables physical design and control logic simpler, and are configured for interconnection between a chip and a graphics memory expansion to realize shorter physical transmission distance, compared with memory sharing via PCIe, thereby greatly reducing time delay during data transmission. The peer-to-peer connection between $FAC^j_{q(j)}$ and $SAC_i$ needs to meet the condition that $FAC^j_{q(j)}$ and $SAC_i$ are not interconnected and $FAC^j_{q(j)}$ and SACK are not interconnected when $FAC^j_{q(j)}$ and $SAC_i$ are interconnected, wherein $FAC^j_{q(j)}$ is the $p(j)$-th cross-chip interconnector on $C_j$, SACK is a cross-chip interconnector on the k-th graphics memory expansion $E_k$, $p(j) \neq q(j)$, and $i \neq k$.

Preferably, when $FAC^j_{q(j)}$ is interconnecting with the $p(k)$-th cross-chip interconnector $(FAC^k_{p(k)})$ on the k-th GPU chip $(C_k)$ in the set of GPU chips, $FAC^j_{q(j)}$ is unable to interconnect with $SAC_i$, or when $FAC^j_{q(j)}$ is interconnecting with the cross-chip interconnector of a GPU chip, it is unable to interconnect with $SAC_i$.

Optionally, when N=1 and M=1, the GPU processor system comprises one GPU chip and one graphics memory expansion connected with the GPU chip, in a one-to-one expansion structure.

Optionally, when N=1 and M>1, the GPU processor system comprises one GPU chip and a set of M graphics memory expansions connected with the GPU chip, in a one-to-many expansion structure.

Optionally, when N>1 and M>1, the GPU processor system may include a one-to-one expansion structure or a one-to-many expansion structure. Furthermore, the processor system may also include a one-to-one expansion structure and a one-to-many expansion structure at the same time.

Furthermore, $MC1_j$ is unable to control access to $H2_i$, and $MC2_i$ is unable to control access to $H1_j$.

It should be understood that $C_j$ accesses $H1_j$ through $MC1_j$ and accesses $H2_i$ through $MC2_i$, both $H1_j$ and $H2_i$ are graphics memories dedicated to $C_j$, and $MC2_i$ is directly accessed only by $C_j$, thereby solving the problem of resource competition resulting from sharing of internal memory or graphics memory, and breaking through the upper capacity limit of an expanded dedicated graphics memory.

$H1_j$ and $H2_i$ adopt unified addressing. Specifically, $C_j$ comprises an address translation unit through which $H1_j$ and $H2_i$ are subjected to unified address conversion.

Optionally, $C_j$ further comprises a first interface bus for internal memory sharing with a CPU. Optionally, the first interface bus is an AGP bus or PCIe bus. It should be noted that internal memory sharing refers to the use of part of the internal memory as a graphics memory special for $C_j$ and the other part as an internal memory special for CPU. It means $C_j$ accesses the internal memory controller of CPU via the first interface bus, thereby accessing the storage space of the internal memory as the graphics memory special for $C_j$ via the internal memory controller of CPU.

Optionally, the bandwidth of $H2_i$ is higher than that of internal memory shared by CPU.

Furthermore, for any processor other than $C_j$: the processor has no access to $MC2_i$; or the processor is given access to $MC2_i$ exclusively through $FAC^j_{q(j)}$ and SAC if the processor has access to $MC2_i$.

Preferably, $E_i$ further includes a data read-write controller $RWC_i$, $RWC_i$ is connected with $MC2_i$, and $SAC_i$ is connected with $RWC_i$; when $RWC_i$ receives a first access command from $C_j$ through $FAC^j_{q(j)}$ and $SAC_i$, $RWC_i$ converts the first access command into a second access command, and transmits the second access command to $MC2_i$; $MC2_i$ is unable to identify the first access command; and $MC2_i$ is configured to identify the second access command.

$RWC_i$ is configured for converting command formats. When the first access command received by $RWC_i$ fails to be identified by $MC2_i$, $RWC_i$ converts the first access command into the second access command and transmits the second access command via a second bus to $MC2_i$ which then issues read/write tasks to $H2_i$. When the first access command is a data reading command, $H2_i$ will return data to $C_j$ sequentially through $MC2_i$, the second bus, $RWC_i$, $SAC_i$, and $FAC^j_{q(j)}$. The return process is reverse to the access process so that the second access command needs to be converted back to the first access command, wherein the first and the second access command have different command formats. Specifically, the data packet of the first access command transmitted between $C_j$ and $E_i$ is bigger than that of the second access command transmitted inside $E_i$. For example, the data packet of the first access command includes a 128Byte read-write command, while the data packet of the second access command includes a 32Byte read-write command. Before the first access command is converted into the second access command, $SAC_i$ parses the received first access command to obtain multiple read-write commands, and transmits the 32Byte-256Byte read-write commands in the unit of 4 KB virtual page to the data read-write controller $RWC_i$, so that $RWC_i$ repacks the read-write commands to obtain the second access command.

Optionally, the protocol of the second bus is the AXI bus protocol.

Preferably, the graphics memory expansions are implemented on an FPGA or ASIC.

In summary, the processor system provided in the invention is connected with a graphics memory expansion via the cross-chip interconnector of GPU. The GPU accesses a graphics memory controller $MC2_i$ via the cross-chip interconnectors of $C_j$ and $E_i$, thereby accessing a graphics memory of $E_i$. Other processors have no access to $MC2_i$, or other processors are given access to $MC2_i$ through the cross-chip interconnectors of $C_j$ and $E_i$ if other processors have access to $MC2_i$. $MC1_j$ is unable to access $H2_i$, and $MC2_i$ is unable to access $H1_j$, so that $H2_i$ serves as a graphics memory special for GPU, without requiring the alteration of $MC1_j$ in a high-performance GPU, or the replacement of GDDR or HBM irremovably coupled to $MC1_j$, that is to say, separate graphics memories special for GPU are increased, without altering the hardware structure of the graphics memory controller of GPU or the overall hardware architecture of GPU, while achieving higher compatibility and lower cost.

It should be noted that the order of the inventive embodiment mentioned hereinabove is only for description and does not imply strength and weakness of the embodiment. The specific embodiment of this specification is described hereinabove. Other embodiments fall into the scope of the attached claims. Under some circumstances, the actions or steps recorded in the claims can be performed in an order different from that in the embodiment but still can achieve desired results. In addition, the process described in the figure does not necessarily require the shown specific order or continuous order to achieve the desired results. In some embodiments, multitasking and parallel processing are also acceptable or may be advantageous.

Each embodiment in the specification is described in a progressive manner, the same and similar parts of each embodiment are mutually referable, and each embodiment focuses only on its difference from the other embodiments.

Hereinabove mentioned is only a preferred embodiment of the invention, and not intended to limit the invention. Any modification, equivalent replacement, improvement, etc. made within the spirit and principle of the present invention should be covered within the protection scope of the present invention.

What is claimed is:

1. A GPU processor system, comprising:
a set of N GPU chips $\{C_1, C_2, \ldots, C_j, \ldots, C_N\}$;
a graphics memory $H1_j$, which is irremovably coupled to a graphics card on which $C_j$ is mounted; and
a set of M separate graphics memory expansions $\{E_1, E_2, \ldots, E_i, \ldots, E_M\}$, wherein:
$C_j$ includes:
an unalterable graphics memory controller $MC1_j$; and
a set of N1(j) cross-chip interconnectors $\{FAC^j_1, FAC^j_2, \ldots, FAC^j_{q(j)}), \ldots, FAC^j_{N1(j)}\}$;
$MC1_j$ is configured to control access to $H1_j$;
$E_i$ includes:
a graphics memory controller $MC2_i$;
a graphics memory $H2_i$; and
a cross-chip interconnector $SAC_i$;
$MC2_i$ is configured to control access to $H2_i$;
$FAC^j_{q(j)}$ and $SAC_i$ are interconnected by a non-QPI interconnection bus;
$MC1_j$ is unable to control access to $H2_i$;
$MC2_i$ is unable to control access to $H1_j$;
for any processor other than $C_j$:
the processor has no access to $MC2_i$; or
the processor is given access to $MC2_i$ exclusively through $FAC^j_{q(j)}$ and $SAC_i$ if the processor has access to $MC2_i$;
N is a positive integer;
M is a positive integer;
N1(j) is a positive integer;
j is an integer ranging from 1 to N;
$C_j$ is the j-th GPU chip in the set of GPU chips;
q(j) is an integer ranging from 1 to N1(j);
$FAC^j_{q(j)}$ is the q(j)-th cross-chip interconnector on $C_j$; and
i is an integer ranging from 1 to M.

2. The system in claim 1, wherein $FAC^j_{q(j)}$ and $SAC_i$ are interconnected by a bus that complies with one of MetaX Link, NVLink, Infinity Fabric and UCIe.

3. The system in claim 2, wherein:
$FAC^j_{q(j)}$ includes a physical layer, an adaptation layer and a protocol layer; and
$SAC_i$ includes a physical layer, an adaptation layer and a protocol layer.

4. The system in claim 1, wherein:
$H2_i$ has a greater memory capacity than $H1_j$; and
$H2_i$ has a lower bandwidth than $H1_j$.

5. The system in claim 4, wherein: $H1_j$ is a graphics memory complying with HBM or GDDR.

6. The system in claim 4, wherein: $H2_i$ is a graphics memory complying with DDR or LPDDR.

7. The system in claim 1, wherein:
$E_i$ further includes a data read-write controller $RWC_i$;
$RWC_i$ is connected with $MC2_i$;
$SAC_i$ is connected with $RWC_i$; and
when $RWC_i$ receives a first access command from $C_j$ through FAC q and $SAC_i$:
$RWC_i$ converts the first access command into a second access command;
$RWC_i$ transmits the second access command to $MC2_i$;

$MC2_i$ is unable to identify the first access command; and $MC2_i$ is configured to identify the second access command.

8. The system in claim 1, wherein $H2_i$ is connected with $MC2_i$ via a DIMM interface.

9. The system in claim 1, wherein the GPU chip is one of graphics processors, general-purpose graphics processors and AI processors.

10. The system in claim 1, wherein the graphics memory expansion is implemented on an FPGA or an ASIC.

*   *   *   *   *